Aug. 26, 1952          H. McINTOSH          2,607,952
                         STEAK MACHINE
Filed Dec. 7, 1946                      2 SHEETS—SHEET 1
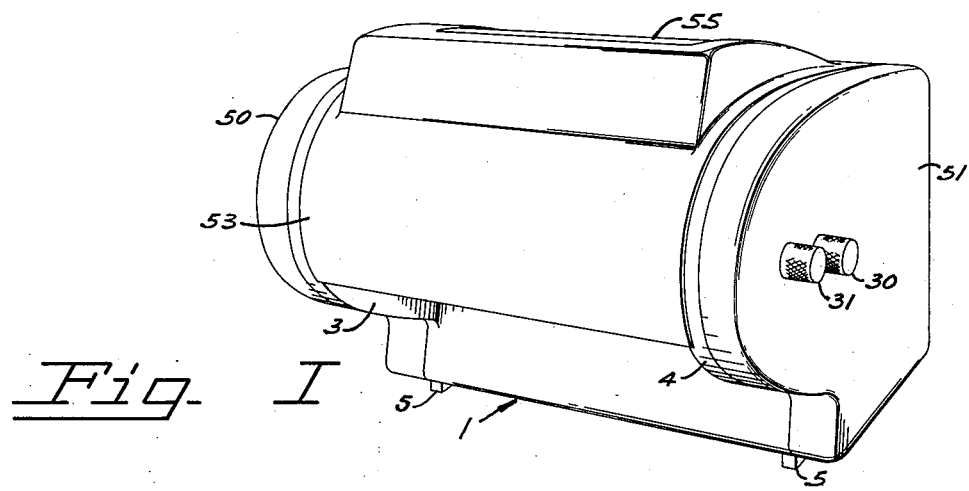
Fig. I
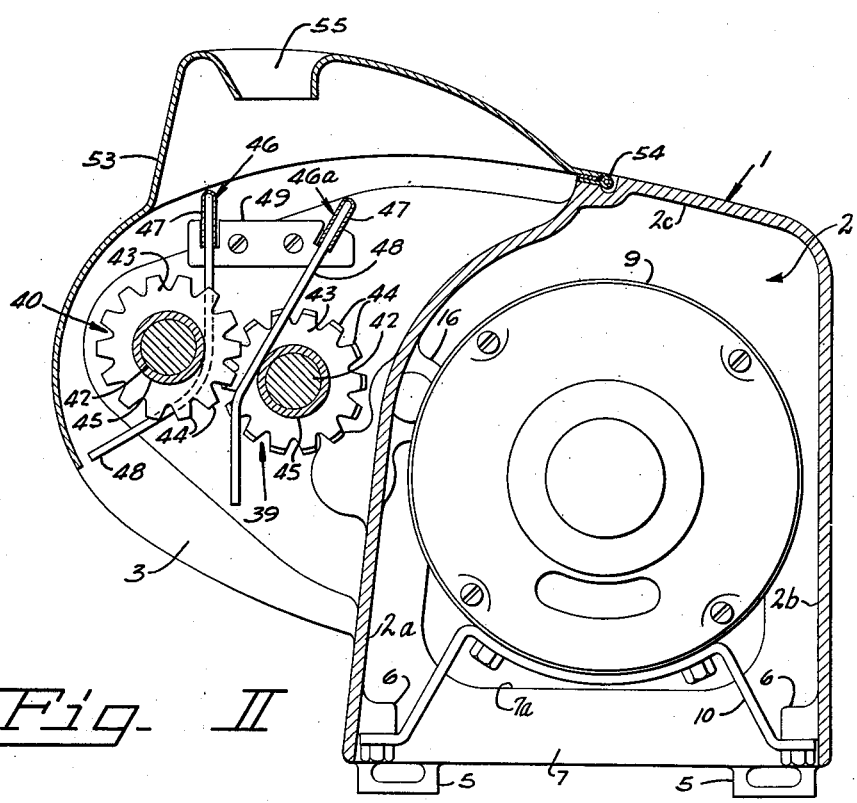
Fig. II
INVENTOR.
Harris McIntosh
BY
Marshall and Marshall
ATTORNEYS Aug. 26, 1952     H. McINTOSH     2,607,952
STEAK MACHINE
Filed Dec. 7, 1946     2 SHEETS—SHEET 2
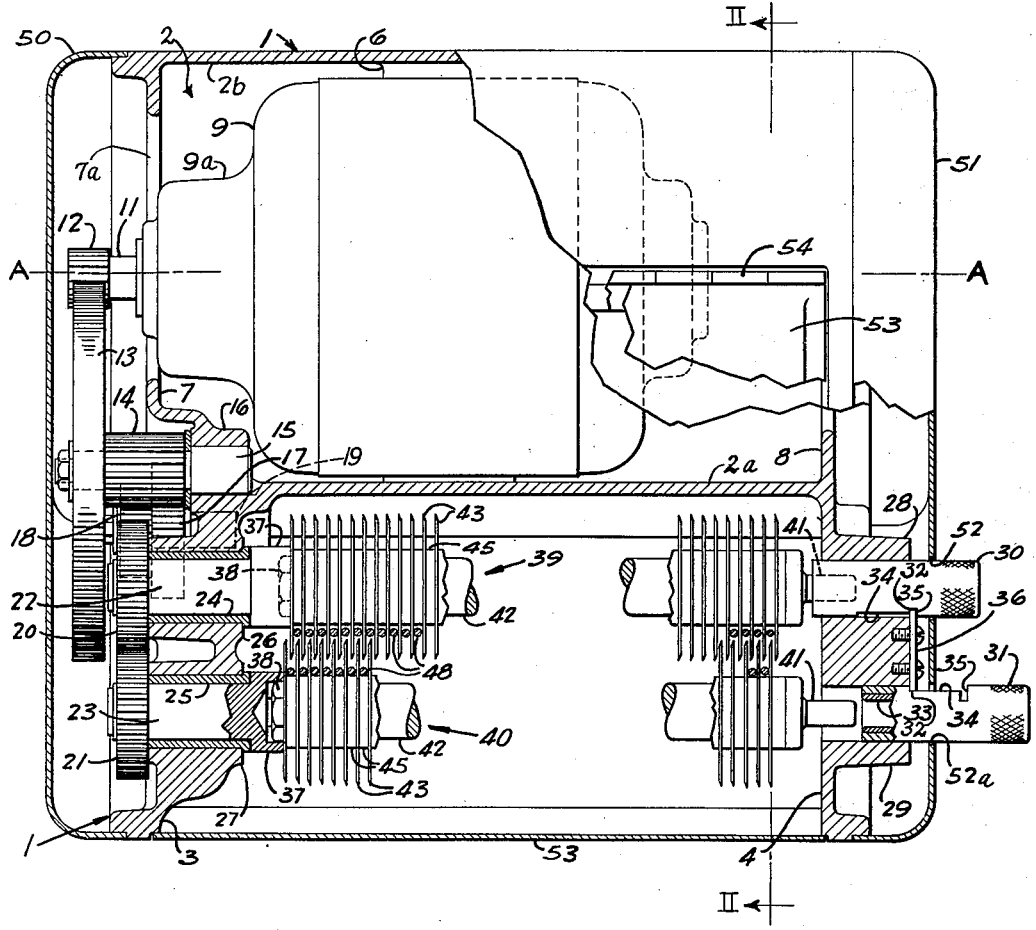
Fig. III
INVENTOR.
Harris McIntosh
BY
Marshall and Marshall
ATTORNEYS Patented Aug. 26, 1952

2,607,952

UNITED STATES PATENT OFFICE 2,607,952

STEAK MACHINE

Harris McIntosh, Toledo, Ohio, assignor to Toledo Scale Company, Toledo, Ohio, a corporation of New Jersey Application December 7, 1946, Serial No. 714,833

3 Claims. (Cl. 17—26)

This application relates to steak machines of the type employed for rendering more palatable the less expensive and less desirable cuts of meat and for blending together small bits of meat into larger more appetizing steaks and cutlets.

Steak treating or blending machines of this type usually are equipped with a pair of parallel intermeshing treating rolls each of which consists of an arbor or shaft upon which are mounted a plurality of disk-shaped cutters having teeth on their peripheries. By rotating the two rolls toward each other the teeth of the disk-shaped cutters engage and cut into the meat to be treated, pulling it through between the rolls and making a multiplicity of short incisions in each surface of the meat. These short incisions sever the connecting fibers and sinews and make the meat more tender and, consequently, more palatable.

The machines of the prior art for the most part have consisted of upright housing or casings within which were located driving motors, power transmission means and the cutter rolls. Since it is desirable to feed the meat to the cutter rolls by gravity from above, the rolls usually have been mounted at the top of the housing above the motor and power transmission mechanism. It was necessary, therefore, in these machines to deflect the meat forwardly after it had passed between the cutters in order to carry it out of the machine so that it could be grasped in an operator's fingers. These machines therefore were equipped with deflector plates which extended from within the housing over the motor out through the side of the housing to carry the treated pieces of meat out of the machine.

This general arrangement of the parts of a steak treating machine, while customary and almost universally employed in commercial steak machines, is objectionable from several standpoints. Primary among these is the fact that when the treated pieces of meat slide over a deflector plate of this type the juices and greases which are released from the meat by the cutter action are smeared over the deflector plate. The surface of the plate therefore becomes an excellent breeding ground for airborne bacteria and mold spores which are present at all times in the atmosphere and which collect with rapidity and persist with obstinacy on any greasy surface where the presence of the proteins in the animal matter permits them to live and multiply. A deflector plate of this type is, therefore, a culture slab for food infecting organisms and each successive piece of meat which slides over its surface collects a portion of the bacteria and mold spores that inhabit the surface. A grease collecting surface of this kind is difficult to clean unless it is readily removable from the machine and the frequent sterilization that is required if the machine is to be maintained in sanitary condition is liable to be neglected.

A further disadvantage of machines constructed in accordance with the prevailing practice of the prior art lies in the fact that since all parts of the machine are stacked above each other the resulting housings are relatively tall and must, therefore, be placed on low counters or tables in order to minimize the inconvenience of their use.

It is the principal object of this invention to provide a steak machine in which the cutter rolls are located in a portion of the machine which does not overlie the remainder of the machine and are so oriented that an operator at either side of the machine can most conveniently feed a steak between the rolls with one hand and catch the steak with the other hand as the steak emerges from between the rolls.

It is a further object of this invention to provide a steak machine which can be considerably smaller in size and in particular can have considerably less height than machines organized according to the design that prevailed in the prior art.

More specific objects and advantages will be apparent from the drawings in which:

Figure I is a perspective view taken from the upper front and side of a steak machine embodying the invention.

Figure II is a transverse vertical sectional view taken substantially along the line II—II of Figure III.

Figure III is a plan view of the machine shown in Figure II with certain parts broken away and other parts shown in section to more clearly indicate their cooperation.

The steak machine illustrated in the drawings and which embodies the instant invention is designed with the cutter rolls supported in an overhanging portion of the machine so that the space beneath the rolls into which steaks fall after being treated is free and clear of all obstruction.

The machine illustrated in the drawings comprises a main cast housing 1 which is designed with a principal open bottomed chamber 2 and a pair of upper forwardly extending arms 3 and 4. The arms 3 and 4 extend forwardly from the housing 1 in a direction substantially perpendicular to the longitudinal axis of the machine indicated by the line A—A of Figure III. Feet 5 are formed, preferably integrally, on the lower corners of the housing 1 and bosses 6 are cast on the interior of the walls of the housing. The side walls 2a and 2b and the top 2c of the housing 1 are solid. End walls 7 and 8 of the housing, however, are open in their central portions to such an extent that they consist of mere flanges which serve to strengthen the casting as a whole.

A driving motor 9 is mounted on a bent bar metal cradle 10 which in turn is bolted to the bosses 6 formed on the interior of the walls of the housing 1. A left end bell 9a of the motor 9 (see Figure III), extends through the center opening 7a in the wall 7, and the motor shaft 11 projects through the wall. A pinion 12 is secured on the end of the shaft 11 and meshes with a bull gear 13 which is mounted coaxially with and keyed to a pinion 14. The gear 13 and pinion 14 are both journaled on a stub shaft 15 which is fixed in a boss 16 formed at the junction of the end wall 7 and the front wall 2a of the housing 1. The pinion 14 in turn meshes with a gear 17 which is keyed to another gear 18 rotatably mounted with the gear 17 on a shaft 19 journaled in the arm 3. The gear 18 meshes with one of a pair of driven gears 20 and 21 which are secured on the outer ends of a pair of arbors 22 and 23 journaled in turn in sleeve bearings 24 and 25 which are mounted in a pair of bosses 26 and 27 formed in the arm 3.

Opposite the bosses 26 and 27 which are formed in the arm 3 are a pair of bosses 28 and 29 which are formed in the arm 4 at the other side of the machine. The bosses 28 and 29 mount a pair of slidable journals 30 and 31. Each of the journals 30 and 31 is bored longitudinally at its inwardly projecting end to receive a sleeve bearing 33. The outer ends of the journals 30 and 31 are knurled to facilitate manual movement thereof. Each of the journals 30 or 31 has a flat 34 milled along its outer surface and a transverse slot 35 at the outer end of the flat 34. A locking plate 36 is attached to the outer side of the arm 4 between the bosses 28 and 29 and has squared ends 32 which extend into the space afforded by the flats 34 to limit the longitudinal movement of the journals 30 and 31 and extend into the slots 35 when the journals 30 and 31 are rotated toward each other thus locking the journals in their innermost positions.

The inner ends of the arbors 22 and 23 are provided with hexagonal sockets 37 which are adapted to receive hexagonal nuts 38 secured on the left ends of a pair of cutter rolls 39 and 40. The other ends of the cutter rolls 39 and 40 are formed into cylindrical tenons 41 which are engageable in the sleeve bearings 33 of the sliding journals 30 and 31.

Each of the cutter rolls 39 and 40 comprises a shaft 42 on which are mounted a plurality of disk-shaped cutters 43 the edges of which are fashioned into sharpened teeth 44. Between adjacent ones of the cutters 43 are inserted spacing collars 45 which space successive cutters on each shaft a sufficient distance to permit the cutters on the other shaft to extend between them, the peripheries of the cutters overlapping to a distance approximately equal to the depth of the teeth. As can best be seen in Figure III the cutters 43 on the two rolls 39 and 40 are interdigitated throughout the length of the rolls.

In order to ensure that the piece of meat to be treated passes downwardly between the cutter rolls comprising the cutters 43 on their shafts, the machine is equipped with a pair of guides 46 and 46a which consist of cross arms 47 and parallel downwardly extending guide rods 48. One of the guide rods 48 extends between each adjacent pair of cutters 43 on each of the rolls 39 and 40 to prevent pieces of meat from clinging to and being carried around with the cutters. The guide rods 48 extend a sufficient distance below and beyond the rolls 39 and 40 so that they carry the meat completely out from between the rolls. The two guides 46 and 46a are supported in a pair of slotted brackets 49 one of which is secured at the upper edge of each of the arms 3 and 4 of the housing 1.

In order to clean the machine the guides 46 and 46a are withdrawn upwardly from between the cutters 43 on the two rolls 39 and 40 and the journals 30 and 31 are successively slid to the right (the journal 31 is shown in this position in Figure III) to free the tenons 41 so that the rolls can be moved slightly to the right to disengage the nuts 38 from the sockets 37 and permit the rolls 39 and 40 to be removed.

The drive gearing connecting the motor 9 to the cutter rolls is covered by a stamped end closure 50 which blends into the exterior contour of the housing 1 and finishes the left end of the machine. A similar end closure 51 is secured at the opposite end of the machine, overlying the outside end of the arm 4 and enclosing the open end of the housing. The end closure 51 has two holes 52 and 52a which are in line with and through which project the knurled ends of the slidable journals 30 and 31.

The space between the arms 3 and 4 and in front of the forward wall of the motor chamber 2, that is, the space in which the cutter rolls are mounted, is enclosed from above by a cover 53 which is hinged at its rear edge by a hinge 54 lying along and secured within a shallow trough in the forward edge of the top wall of the housing 1. The cover 53 has a transverse chute-like opening 55 which extends longitudinally above the cutter rolls and through which pieces of meat to be treated are inserted into the machine. The cover 53 can be swung up and back when it is desired to remove the rolls for cleaning or other purposes.

As can best be seen by reference to Figure II, when a piece of meat is dropped downwardly through the chute-like opening 55 it passes directly into the space defined by the guides 46 and 46a and between the cutter rolls. Upon leaving the rolls the meat falls into an open space beneath the rolls some distance in front of the housing 1. It will be observed that an operator facing the machine from the right forward corner, as seen in Figure I, can feed with his right hand a steak through the chute-like opening 55 and can catch the steak with his left hand as it emerges from between the rolls into the clear space beneath them. Likewise, an operator facing the machine from the left forward corner can feed a steak into the machine with his left hand and catch it with his right as it emerges into the clear space. There often are several operators who successively use the same machine. On busy days they can alternate, one processing a steak from a position at the right front, the next from a position at the left front, and so on.

The steaks emerge from the machine much lacerated and much elongated vertically, but with the handling made possible by the organization of the machine as shown and described herein, steaks processed on the machine can be kept from falling apart and from wadding even if they are passed through the machine two or three times, whereas steaks thus lacerated and elongated are liable to become wadded if dropped onto a tray or down a chute and are liable to be pulled apart as they are picked up after having landed on a flat surface. Because the cutter rolls are located in front of the motor rather than above it, not only is the objectionable deflector plate of the prior art eliminated, but also the height of the machine is materially reduced.

The novel arrangement above described thus overcomes several important objections which exist in conventional prior art machines, as well as facilitates the maintenance of the machine in sanitary condition.

The embodiment of the invention which has been described may be modified to meet various requirements.

Having described the invention, I claim:

1. In a steak machine, in combination, an oblong housing, a motor located within said housing, a shaft support fixed to each end of said housing and extending forwardly therefrom, a pair of parallel shafts rotatably carried by said shaft supports, said shafts being spaced from each other and from said housing and extending in the direction of elongation of said housing, said shafts lying at heights between the height of the axis of said motor and the height of the top of said motor, a series of serrated cutting disks fixed upon each of said shafts, motion transmitting means connecting said motor to said shafts to turn them with their adjacent sides moving downwardly, and means for guiding steaks between said shafts to be lacerated by said serrated cutting disks, there being a clear space beneath said shafts, said space being adapted to receive the hand of an operator, the location and orientation and space relationship of the elements of the combination above defined thus being such as to facilitate the feeding of a steak into the steak machine from above with either of the operator's hands and catching such steak with the other hand at it emerges into the clear space beneath the shafts.

2. In a steak machine, in combination, an oblong housing, a motor located within said housing, a shaft support fixed to each end of said housing and extending forwardly therefrom, a pair of parallel shafts rotatably carried by said shaft supports, said shafts being spaced from each other and from said housing and extending in the direction of elongation of said housing, a series of serrated cutting disks fixed upon each of said shafts, motion transmitting means connecting said motor to said shafts to turn them with their adjacent sides moving downwardly, and means for guiding steaks between said shafts to be lacerated by said serrated cutting disks, there being a clear space beneath said shafts, said space being adapted to receive the hand of an operator, the location and orientation and space relationship of the elements of the combination above defined thus being such as to facilitate the feeding of a steak into the steak machine from above with either of the operator's hands and catching such steak with the other hand as it emerges into the clear space beneath the shafts.

3. In a steak machine, in combination, an oblong frame, means for enclosing said frame, a motor located within the compass of said frame, a shaft support fixed to each end of said frame and extending forwardly therefrom, a pair of parallel shafts rotatably supported by said shaft supports, said shafts being spaced from each other and extending in the direction of elongation of said frame, said shafts lying at heights between the height of the axis of said motor and the height of the top of said motor, a series of serrated cutting disks fixed upon each of said shafts, motion transmitting means connecting said motor to said shafts to turn them with their adjacent sides moving downwardly, and means for guiding steaks between said shafts to be lacerated by said serrated cutting disks, there being a clear space beneath said shafts, said space being adapted to receive the hand of an operator, the location and orientation and space relationship of the elements of the combination above defined thus being such as to facilitate the feeding of a steak into the steak machine from above with either of the operator's hands and catching such steak with the other hand as it emerges into the clear space beneath the shafts.

HARRIS McINTOSH.

REFERENCES CITED

The following references are of record in the file of this patent:

UNITED STATES PATENTS

| Number | Name | Date |
| --- | --- | --- |
| 1,982,487 | Swift | Nov. 27, 1934 |
| 2,007,464 | Wood | July 9, 1935 |
| 2,167,051 | Motrinec | July 25, 1939 |
| 2,290,812 | Norman | July 21, 1942 |
| 2,398,636 | Henney et al. | Apr. 16, 1946 |
| 2,409,463 | Ahrndt | Oct. 15, 1946 |